(12) United States Patent
Nilsson et al.

(10) Patent No.: US 10,530,454 B2
(45) Date of Patent: Jan. 7, 2020

(54) BEAM SELECTION FOR COMMUNICATING SIGNALS

(71) Applicant: TELEFONAKTIEBOLAGET LM ERICSSON (PUBL), Stockholm (SE)

(72) Inventors: Andreas Nilsson, Göteborg (SE); Andres Reial, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 120 days.

(21) Appl. No.: 15/543,532

(22) PCT Filed: Jun. 15, 2017

(86) PCT No.: PCT/EP2017/064688
§ 371 (c)(1),
(2) Date: Jul. 13, 2017

(87) PCT Pub. No.: WO2018/228695
PCT Pub. Date: Dec. 20, 2018

(65) Prior Publication Data
US 2018/0367203 A1    Dec. 20, 2018

(51) Int. Cl.
*H04B 7/06* (2006.01)
*H04W 16/28* (2009.01)

(52) U.S. Cl.
CPC ......... *H04B 7/0695* (2013.01); *H04B 7/0617* (2013.01); *H04B 7/0632* (2013.01); *H04W 16/28* (2013.01)

(58) Field of Classification Search
None
See application file for complete search history.

(56) References Cited

U.S. PATENT DOCUMENTS

| | | | |
|---|---|---|---|
| 2011/0110453 A1* | 5/2011 | Prasad | H04B 7/0695 375/285 |
| 2018/0278318 A1* | 9/2018 | Chakraborty | H04B 7/0404 |

FOREIGN PATENT DOCUMENTS

WO    2017024516 A1    2/2017

OTHER PUBLICATIONS

International Search Report and the Written Opinion of the International Searching Authority, issued in corresponding International Application No. PCT/EP2017/064688, dated Feb. 16, 2018, 20 pages.

* cited by examiner

*Primary Examiner* — Ayaz R Sheikh
*Assistant Examiner* — Sori A Aga
(74) *Attorney, Agent, or Firm* — Rothwell, Figg, Ernst & Manbeck, P.C.

(57) ABSTRACT

There is provided mechanisms for adapting which beam to use for communicating signals. A method is performed by a radio transceiver device. The radio transceiver device is capable of communicating the signals using beams selected from a set of beams. The method comprises communicating signals with another radio transceiver device while using a first beam selected from the set of beams. The method comprises detecting that the signals are communicated at decreasing quality level while using the first beam. The decreasing quality level is caused by radio propagation channel deterioration. The method comprises, in response thereto, initiating a switch to a backup beam of the first beam, without performing any beam training, to continue communicating the signals with said another radio transceiver device, thereby adapting which beam to use for communicating the signals.

24 Claims, 4 Drawing Sheets

BEAM SELECTION FOR COMMUNICATING SIGNALS

CROSS REFERENCE TO RELATED APPLICATION(S)

This application is a 35 U.S.C. § 371 National Phase Entry Application from PCT/EP2017/064688, filed Jun. 15, 2017, designating the United States, the disclosure of which is incorporated herein in its entirety by reference.

TECHNICAL FIELD

Embodiments presented herein relate to a method, a radio transceiver device, a computer program, and a computer program product for adapting which beam to use for communicating signals.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for terminal devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node at the network side and at the terminal devices at the user side might be required to reach a sufficient link budget.

In general terms, the use of beamforming could imply that the terminal devices will be not only operatively connected to the network node via a beam but also performs a handover between (narrow) beams instead of between network nodes of different cells. At higher frequency bands high-gain beamforming with narrow beams could be used due to more challenging radio propagation properties than at lower frequency bands. Each beam will only be optimal within a small area and the link budget outside the optimal beam will deteriorate quickly. Hence, frequent and fast beam switching is needed to maintain high performance. This is hereinafter referred to as beam management. One purpose of so-called beam management is thus for the network node to keep track of its served terminal devices with narrow beams (as used at the transmission and reception point (TRP) of the network node and/or the terminal devices) in order to increase coverage and throughput.

Due to the high penetration loss through objects and poor diffraction around object edges at higher frequency bands the link between the TRP and the terminal device will be sensitive to blocking. Blocking could occur either slowly/gradually or very suddenly, depending on the speed of movement of the terminal device, and the motion of objects in the environment. The narrower the beams, the more chance there is for sudden blocking to occur. Thus, due to rotation, movement and/or blockage of the served terminal devices the beam (at the TRP and/or terminal devices) needs to be updated dynamically in order to maintain good channel quality between the network node and the served terminal devices.

In case an operative connection between a served terminal device and the network node is lost, for example due to radio propagation channel deterioration such as blocking, a beam recovery procedure can be initiated to re-establish the beam connection. Such a beam recovery procedure could, for example, involve beam training whereby all different combinations of beams, both at the TRP and at the terminal device, are swept through. Beam training could thus be part of beam management. When there are many candidate beams such beam training could be costly in terms of time consumption and overhead signaling.

Further, in case the TRP notice a slow deterioration of the radio propagation channel of the active link the TRP could be configured to try to find a backup link to the terminal device by transmitting signals on the active link before it is lost and then transmitting control signaling that sets up a beam search procedure to find a new active link. However, in case the deterioration is too sudden there will not be enough time to setup and perform a beam search procedure, which will lead to that the active link used for control and data signals between TRP and the terminal device will be lost, thus resulting in a so-called beam link failure (BLF). If the beam link failure cannot be handled properly such that the link between the TRP and the terminal device is not restored within a certain period of time the terminal device might experience a radio link failure (RLF). RLF generally requires protocol layer 3 signaling and introduces both overhead signaling and latency.

Hence, there is still a need for improved handling of situations of radio propagation channel deterioration.

SUMMARY

An object of embodiments herein is to provide efficient adaptation of which beam to use for communicating signals.

According to a first aspect there is presented a method for adapting which beam to use for communicating signals. The method is performed by a radio transceiver device. The radio transceiver device is capable of communicating the signals using beams selected from a set of beams. The method comprises communicating signals with another radio transceiver device while using a first beam selected from the set of beams. The method comprises detecting that the signals are communicated at decreasing quality level while using the first beam. The decreasing quality level is caused by radio propagation channel deterioration. The method comprises, in response thereto, initiating a switch to a backup beam of the first beam, without performing any beam training, to continue communicating the signals with said another radio transceiver device, thereby adapting which beam to use for communicating the signals.

According to a second aspect there is presented a radio transceiver device for adapting which beam to use for communicating signals. The radio transceiver device is capable of communicating the signals using beams selected from a set of beams. The radio transceiver device comprises processing circuitry. The processing circuitry is configured to cause the radio transceiver device to communicate signals with another radio transceiver device while using a first beam selected from the set of beams. The processing circuitry is configured to cause the radio transceiver device to detect that the signals are communicated at decreasing quality level while using the first beam. The decreasing quality level is caused by radio propagation channel deterioration. The processing circuitry is configured to cause the radio transceiver device to, in response thereto, initiate a switch to a backup beam of the first beam, without performing any beam training, to continue communicating the signals with said another radio transceiver device, thereby adapting which beam to use for communicating the signals.

According to a third aspect there is presented a radio transceiver device for adapting which beam to use for communicating signals. The radio transceiver device is capable of communicating the signals using beams selected from a set of beams. The radio transceiver device comprises processing circuitry and a storage medium. The storage medium stores instructions that, when executed by the processing circuitry, cause the radio transceiver device to perform operations, or steps. The operations, or steps, cause the radio transceiver device to communicate signals with another radio transceiver device while using a first beam selected from the set of beams. The operations, or steps, cause the radio transceiver device to detect that the signals are communicated at decreasing quality level while using the first beam. The decreasing quality level is caused by radio propagation channel deterioration. The operations, or steps, cause the radio transceiver device to, in response thereto, initiate a switch to a backup beam of the first beam, without performing any beam training, to continue communicating the signals with said another radio transceiver device, thereby adapting which beam to use for communicating the signals.

According to a fourth aspect there is presented a radio transceiver device for adapting which beam to use for communicating signals. The radio transceiver device is capable of communicating the signals using beams selected from a set of beams. The radio transceiver device comprises a communicate module configured to communicate signals with another radio transceiver device while using a first beam selected from the set of beams. The radio transceiver device comprises a detect module configured to detect that the signals are communicated at decreasing quality level while using the first beam. The decreasing quality level is caused by radio propagation channel deterioration. The radio transceiver device comprises an initiate module configured to, in response thereto, initiate a switch to a backup beam of the first beam, without performing any beam training, to continue communicating the signals with said another radio transceiver device, thereby adapting which beam to use for communicating the signals.

In some aspects the radio transceiver device is a radio access network node and wherein the so-called another radio transceiver device is a terminal device.

According to a fifth aspect there is presented a computer program for adapting which beam to use for communicating signals, the computer program comprising computer program code which, when run on a radio transceiver device being capable of communicating the signals using beams selected from a set of beams, causes the radio transceiver device to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

Advantageously this method, these radio transceiver devices, this computer program and this computer program product provide efficient adaptation of which beam to use for communicating signals. In turn this enables efficient handling of situations of radio propagation channel deterioration.

Advantageously this method, these radio transceiver devices, this computer program and this computer program product enable, in case of blocking, or other reason for radio propagation channel deterioration, a new suitable beam to be identified and applied quickly. This improves the reliability and performance of the radio transceiver device itself as well as the network environment in which the radio transceiver device operates.

Advantageously this method, these radio transceiver devices, this computer program and this computer program product could be a proprietary mechanism for the radio transceiver device only, not relying on any special adaptation of the so-called another radio transceiver device. In fact, it is transparent to the so-called another radio transceiver device. It can be implemented in a single radio transceiver device, thus not requiring inter-cell or radio resource control (RRC) signaling.

It is to be noted that any feature of the first, second, third, fourth, fifth and sixth aspects may be applied to any other aspect, wherever appropriate. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
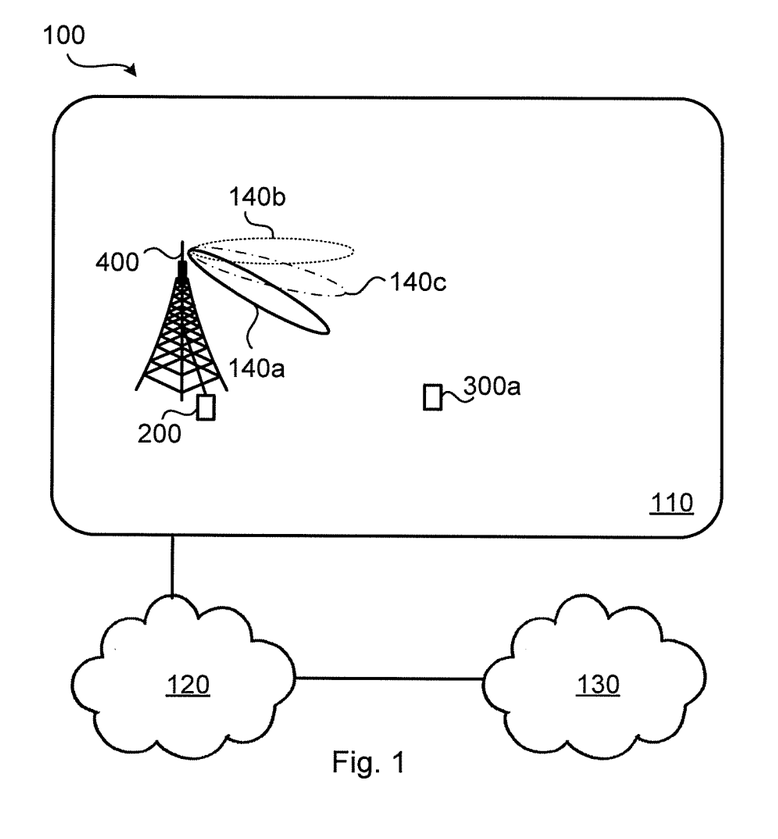
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard.

The communications network 100 comprises a radio transceiver device 200 that are configured to provide network access to radio transceiver device 300a in a radio access network 110. The radio access network no is operatively connected to a core network 120. The core network 120 is in turn operatively connected to a service network 130, such as the Internet. The radio transceiver device 300a is thereby, via the radio transceiver device 200, enabled to access services of, and exchange data with, the service network 130. The radio transceiver device 200 provide network access in the radio access network no by transmitting signals to, and receiving signals from, the radio transceiver device 300a in beams 140a, 140b, 140c. The signals could be transmitted from, and received by, a TRP 400 of the radio transceiver device 200. The TRP 400 could form an integral part of the radio transceiver device 200 or be physically separated from the radio transceiver device 200.

Typically, the radio transceiver device 200 is a network node and the radio transceiver device 300a is a terminal devices. Examples of network nodes are radio access network nodes, radio base stations, base transceiver stations, Node Bs, evolved Node Bs, gigabit Node Bs, access points, and access nodes. Examples of terminal devices are wireless devices, mobile stations, mobile phones, handsets, wireless local loop phones, user equipment (UE), smartphones, laptop computers, tablet computers, network equipped sensors, network equipped vehicles, and so-called Internet of Things devices.

Figure 2:
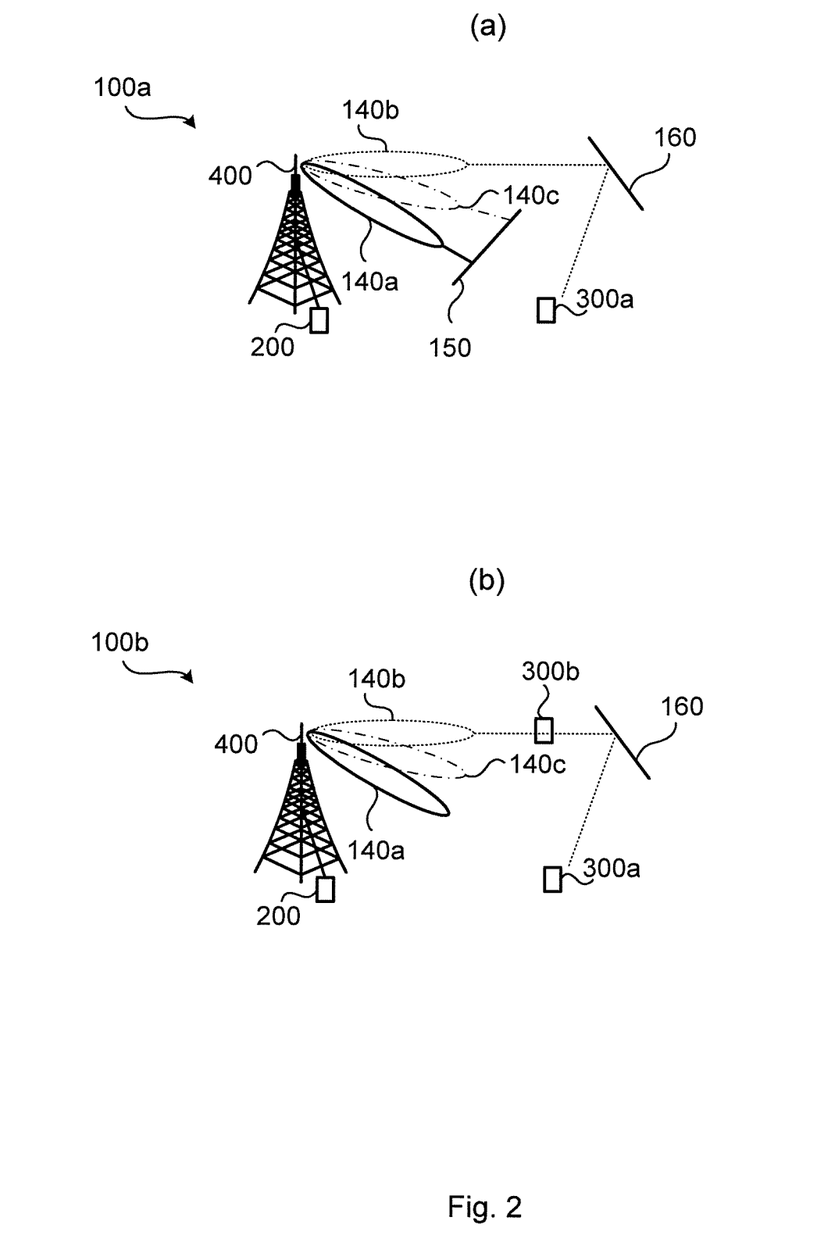
FIG. 2 schematically illustrate parts of the communications network of FIG. 1 according to embodiments.

FIG. 2 schematically illustrates communications networks 100a, 100b representing a part of the communications network and with the addition of reflecting objects 150,160 and yet another radio transceiver device 300b.

FIG. 2(a) illustrates a scenario where a first object 150 is blocking beams 140a, 140c from reaching the so-called another radio transceiver device 300a. When blocking occurs in a beam based system the radio transceiver device 200 will typically try to find a new suitable beam in order to maintain the connection with the so-called another radio transceiver device 300a. As disclosed above, this could be accomplished, for example, by letting the radio transceiver device 200 set up a beam training procedure where the radio transceiver device 200 transmits beam reference signals in multiple different beams and the so-called another radio transceiver device 300a reports back reference signal received power on the K best beams in that sweep (where the value of K could be configured by the radio transceiver device 200). By collecting statistics of such procedures it is possible after some time for the radio transceiver device 200 to define suitable backup beam in case of blocking occurs for a certain beam. According to the illustrative example of FIG. 2(a), radio transceiver device 200 could communicate with the so-called another radio transceiver device 300a by using beam 140b, as reflected by object 160. Beam 140b could thus be a suitable backup beam for beam 140a (or beam 140c).

FIG. 2(b) schematically illustrates a scenario where the radio transceiver device 200 communicates with two radio transceiver devices 300a, 300b. The two radio transceiver devices 300a, 300b are located in different directions and at different distances in relation to the radio transceiver device 200 but still the radio transceiver device 200 uses one and the same beam 140b for the communication with both the two radio transceiver devices 300a, 300b. But for the scenario in FIG. 2(b) it could be unlikely that a beam suitable as backup beam for one of the radio transceiver devices 300a is also a suitable backup beam for the other of the radio transceiver devices 300b.

The embodiments disclosed herein relate to mechanisms for adapting which beam to use for communicating signals. In order to obtain such mechanisms there is provided a radio transceiver device 200, a method performed by the radio transceiver device 200, a computer program product comprising code, for example in the form of a computer program, that when run on a radio transceiver device 200, causes the radio transceiver device 200 to perform the method.

Figure 3:
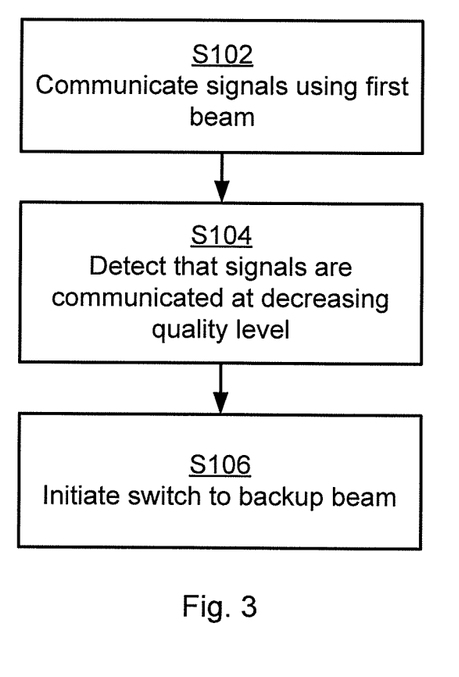
FIGS. 3 and 4 are flowcharts of methods according to embodiments.
Figure 4:
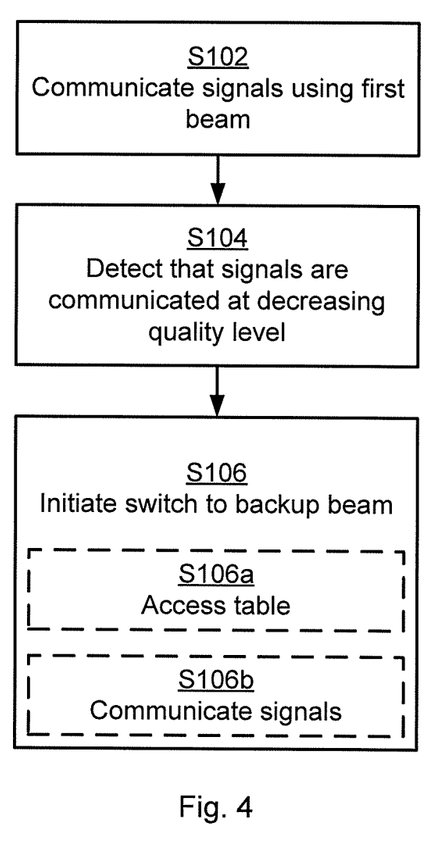

FIGS. 3 and 4 are flowcharts illustrating embodiments of methods for adapting which beam to use for communicating signals. The methods are performed by the radio transceiver device 200. The methods are advantageously provided as computer programs 720.

Reference is now made to FIG. 3 illustrating a method for adapting which beam to use for communicating signals as performed by the radio transceiver device 200 according to an embodiment. The radio transceiver device 200 is capable of communicating the signals using beams selected from a set of beams.

It is assumed that the radio transceiver device 200 and the radio transceiver device 300a has an ongoing communication of data and/or control signals. Hence, the radio transceiver device 200 is configured to perform step S102:

S102: The radio transceiver device 200 communicates signals with another radio transceiver device 300a while using a first beam 140a. The first beam 140a is selected from the set of beams.

It is assumed that the radio transceiver device 200 suddenly experiences radio propagation channel deterioration for the first beam 140a, for example during downlink transmission. Particularly, the radio transceiver device 200 is configured to perform step S104:

S104: The radio transceiver device 200 detects that the signals are communicated at decreasing quality level while using the first beam 140a. The decreasing quality level is caused by radio propagation channel deterioration.

The radio transceiver device 200 then switches beam from the original (first) beam to another (backup) beam at least for some time. Particularly, the radio transceiver device 200 is configured to perform step S106 in response to having detected that the signals are communicated at decreasing quality level:

S106: The radio transceiver device 200 initiates a switch to a backup beam 140b of the first beam 140a to continue communicating the signals with the so-called another radio transceiver device 300a. The switch is initiated without the radio transceiver device 200 performing any beam training. The radio transceiver device 200 thereby adapts which beam to use for communicating the signals.

Thereby, whenever radio propagation channel deterioration occurs, the radio transceiver device 200 is enabled to quickly switch to a suitable backup beam for continued communication with the so-called another radio transceiver device 300a transparently, without delay, and without interruption (expect the delay and interruption associated with the actual switching from one beam to another beam)

In some aspects the radio transceiver device 200 is a radio access network node and the so-called another radio transceiver device 300a is a terminal device.

Embodiments relating to further details of adapting which beam to use for communicating signals as performed by the radio transceiver device 200 will now be disclosed.

Reference is now made to FIG. 4 illustrating methods for adapting which beam to use for communicating signals as performed by the radio transceiver device 200 according to further embodiments. It is assumed that steps S102, S104, S106 are performed as described above with reference to FIG. 3 and a thus repeated description thereof is therefore omitted.

Preferably the first beam 140a and the backup beam 140b are used for transmitting signals to the so-called another radio transceiver device 300a, although communicating the signals could comprise either transmitting the signals to the so-called another radio transceiver device 300a or receiving the signals from the so-called another radio transceiver device 300a.

There could be different factors, properties, or ways, according to which the backup beam 140b is selected.

According to an embodiment, which of the beams in the set of beams to use as backup beam 140b for the first beam 140a is determined based on statistics collected by the radio transceiver device 200.

There could be different types of statistics. According to an embodiment the statistics are based on information collected during data reception from the so-called another radio transceiver device 300a or from reports received from the so-called another radio transceiver device 300a. Additionally, identification of the candidate backup beam 140b could be based on downlink or uplink measurements.

Further, the statistics may be collected in actual beam blocking situations where other beam options from the same TRP are tested as recovery beams for given serving beams. Particularly, according to an embodiment the statistics are collected during periods of blocking of the so-called another radio transceiver device 300a, during periods of mobility measurements of the so-called another radio transceiver device 300a, or during a beam management procedure. Beams that result in successful recovery could thereby be noted as future backup beam candidates together with information as to at what position in the network the so-called another radio transceiver device 300a was located when the statistics were collected. The position may be defined in terms of geographical coordinates, if available (such as obtained from a global positioning system (GPS) or other positioning mechanisms), in terms of signal strength fingerprints, identity of the given serving beam, and/or timing advance information (see, below).

In some aspects the statistics are only collected for non-performance-critical data connections so as to avoid adverse effects from beams that do not provide a successful alternative link. Suitable backup beams may also be identified by tentatively communicating the so-called another radio transceiver device 300a with a potential backup beam, even in cases where there is no occurring radio propagation channel deterioration. If the resulting link consistently has sufficient quality, the beam can be noted as a backup beam in presence of radio propagation channel deterioration.

In some aspects the statistics provide a map between the beams, such as between the first beam 140a and the backup beam 140b. According to an embodiment the statistics comprises beam pairs indicating which backup beam 140b to use for the first beam 140a.

In some aspects timing advance information is stored when collecting the statistics. Thus, according to an embodiment the statistics comprises timing advance values such that each beam pair is associated with one of the timing advance values. As is known by the skilled person, timing advance gives information about timing relations between the sender (such as the TRP 400) and the receiver (such as the so-called another radio transceiver device 300a) and can be used to derive the length of the propagation path between the sender and the receiver, and hence the distance between the sender and the receiver along the propagation path). In more details, the radio transceiver device 200 could keep track of the timing advance (in addition to the serving beam) of the so-called another radio transceiver device 300a when collecting statistics for backup beams in order to find out how far away from the TRP 400 the so-called another radio transceiver device 300a is located. In addition to the direction of departure for the beams, the propagation delay and/or timing advance over the different beams may thus be used to ascertain whether, and which, different beams lead to different propagation paths.

According to an embodiment each beam in the set of beams is associated with $N>1$ different timing advance intervals, and a separate backup beam could be associated with each of the N timing advance intervals for each of the beams.

Reference is again made to FIG. 2(b) illustrating a scenario where it could be suitable to collect timing advance information. In FIG. 2(b) the radio transceiver device 200 uses one and the same beam 140b for the communication with the two radio transceiver devices 300a, 300b. Due to the reflection in the object 160 the actual direction between the line of sight path between the radio transceiver device 200 with respect to the two radio transceiver devices 300a, 300b differs. This will most likely lead to that different backup beams are preferred for the two radio transceiver devices 300a, 300b. This could be handled by collecting also timing advance information from the radio transceiver devices 300a, 300b when collecting the statistics.

There could be different ways to handle, and store, the statistics. In some aspects the statistics are stored in a lookup table. Whenever there is a need for using a backup beam, the radio transceiver device 200 accesses the lookup table to find a suitable backup beam. Particularly, according to an embodiment, which antenna elements and/or which analog beam configuration to use for each beam in the set of beams is indexed in a table. The radio transceiver device 200 could then be configured to initiate the temporary switch in step S106 by performing (optional) steps S106a and S106b:

S106a: The radio transceiver device 200 accesses the table to determine which of the antenna elements and/or analog beam configurations to use for the backup beam 140b.

S106b: The radio transceiver device 200 communicates the signals in the backup beam 140b using the determined antenna elements and/or analog beam configuration.

There could be different ways for the radio transceiver device 200 to detect the radio propagation channel deterioration and hence detect that the signals are communicated at decreasing quality level while using the first beam 140a, as in step S104.

According to an embodiment the radio propagation channel deterioration is detected by absence of reception of expected signals from the so-called another radio transceiver device 300a, by reception of a beam link failure report from the so-called another radio transceiver device 300a, and/or by reference signal received power of signals received from the so-called another radio transceiver device 300a dropping faster than a threshold rate.

In cases where high-fidelity position information of the so-called another radio transceiver device 300a, as well as reliable history of beam failure events and backup beam identities is available, the switch to the backup beam 140b could be applied pro-actively, thus even before detecting the radio propagation channel deterioration.

Further different factors, properties, or ways, according to which the backup beam 140b is selected will now be disclosed.

According to an embodiment the backup beam 140b, among all beams in the set of beams, has lowest spatial correlation with the first beam 140a.

Spatial correlation can be described in a quasi co-location (QCL) framework adopted in Long Term Evolution (LTE) telecommunications networks and extended to spatial QCL in New radio (NR) telecommunications networks.

There could be different examples of low spatial correlation.

In some aspects the beams (i.e. the first beam 140a and the backup beam 140b) differ as much as possible in angular space. That is, according to an embodiment the lowest spatial correlation corresponds to a maximum difference in pointing direction in angular space. It could thereby be possible to select a beam as the backup beam 140b that differs as much as possible in angular space compared to the currently used first beam 140a. In this respect the direction of the first beam 140a is known based on the antenna array structure. Beams from the antenna array whose direction of departure differ by more than, say, 45 degrees are unlikely to be blocked simultaneously, unless the blocking object is very close to the antenna array.

Another example is to select a backup beam 140b with least overlap in its antenna diagram with the first beam 140a. In some aspects the beams (i.e. the first beam 140a and the backup beam 140b) thus have least comparative overlap in antenna diagram space. That is, according to an embodiment the lowest spatial correlation corresponds to a minimum overlap in antenna diagram space. The least comparative overlap could be defined as largest Half Power Beam Width (HPBW) separation. The least comparative overlap could also be largest beam gain difference integrated over the whole sphere or a selected angle-range.

It might be so that the backup beam with largest angular separation, or overlap, to the first beam 140a has comparatively low received power such that the uplink or downlink performance will be significantly reduced if this backup beam used. In this case it might be advantageous to select as backup beam the beam that is closer in angular space to the first beam 140a but with high received power. In some aspects it is thus conditioned that the backup beam 140b has sufficiently high received power or quality compared to first beam 140a. Particularly, according to an embodiment the backup beam 140b is selected from the set of beams as constrained to those of the beams having an estimated reference signal received power (RSRP) value or channel quality indication (CQI) value being within a threshold distance to that of the first beam 140a. This enables a trade-off between beam separation on the one hand and RSRP/CQI on the other hand.

Further, in scenarios where the first beam 140a has at least two backup beams 140b, 140c, the at least two backup beams 140b, 140c could be ordered according to increasing spatial correlation with the first beam 140a and/or decreasing estimated RSRP values and/or CQI values in relation to the first beam 140a.

The threshold distance could be selected such that the backup beam is selected with as large angular separation as possible to the first beam 140a but with the additional requirement that the RSRP or CQI is within the threshold distance to that of the first beam 140a. The threshold distance could be an absolute value or be relative to the first beam 140a or relative to other candidate backup beams. The threshold distance could be a configurable parameter, e.g. set by higher layer signaling such as RRC signaling, or it can be fixed in a specification.

As disclosed above, the first beam 140a is selected from a set of beams. In some aspects also the backup beam 140b is selected from this set of beams. However, the radio transceiver device 200 is not limited to select which beam to use only from the first beam 140a and the backup beam 140b. There could be multiple beams in the set of beams for the radio transceiver device 200 to select from at any given time. However, each beam in the set of beams could have a backup beam, and a switch to a backup beam from any of the beams in the set of beams could thus be possible without performing any beam training on the fly. According to an embodiment each beam in the set of beams has its own unique backup beam 140b such that no two beams in the set of beams share a common backup beam 140a. Alternatively, there are at least two beams in the set of beams that share a common backup beam 140b The radio transceiver devices could implement beamforming by means of analog beamforming, digital beamforming, or hybrid beamforming. Each implementation has its advantages and disadvantages. According to an embodiment the radio transceiver device 200 is configured to communicate the signals using the at least one beam by means of analog beamforming or hybrid beamforming.

There could be different causes for the radio propagation channel deterioration. According to an embodiment the propagation channel deterioration is caused by blocking, such as in FIG. 2.

Figure 5:
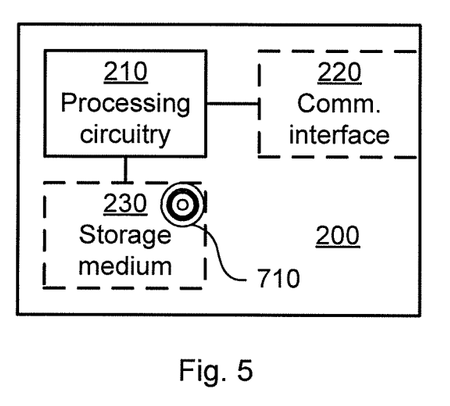
FIG. 5 is a schematic diagram showing functional units of a radio transceiver device according to an embodiment.

FIG. 5 schematically illustrates, in terms of a number of functional units, the components of a radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200 to perform a set of operations, or steps, S102-S106b, as disclosed above. For example, the storage medium 230 may store the set of operations, and the processing circuitry 210 may be configured to retrieve the set of operations from the storage medium 230 to cause the radio transceiver device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200 may further comprise a communications interface 220 at least configured for communications with other entities, nodes, functions, and devices of the communications network 100. As such the communications interface 220 may comprise one or more transmitters and receivers, comprising analogue and digital components. The processing circuitry 210 controls the general operation of the radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200 are omitted in order not to obscure the concepts presented herein.

Figure 6:
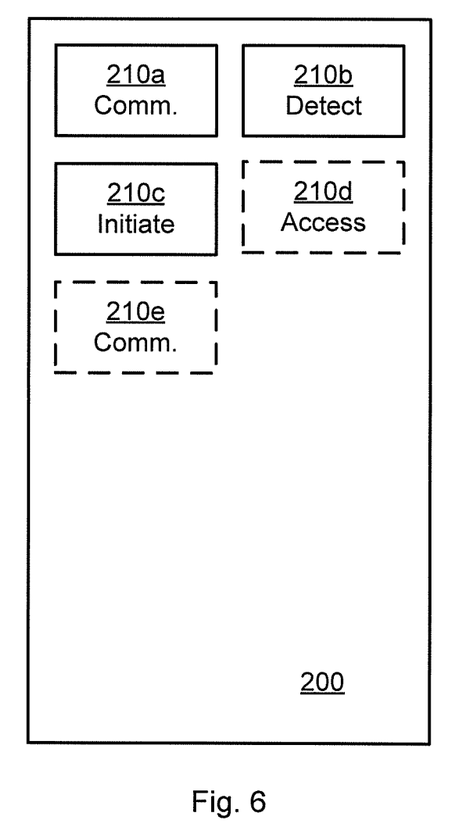
FIG. 6 is a schematic diagram showing functional modules of a radio transceiver device according to an embodiment.

FIG. 6 schematically illustrates, in terms of a number of functional modules, the components of a radio transceiver device 200 according to an embodiment. The radio transceiver device 200 of FIG. 6 comprises a number of functional modules; a communicate module 210a configured to perform step S102, a detect module 210b configured to perform step S104, and an initiate module 210C configured to perform step S106. The radio transceiver device 200 of FIG. 6 may further comprise a number of optional functional modules, such as any of an access module 210d configured to perform step S106a and a communicate module 210e configured to perform step S106b. In general terms, each functional module 210a-210e may in one embodiment be implemented only in hardware and in another embodiment with the help of software, i.e., the latter embodiment having computer program instructions stored on the storage medium 230 which when run on the processing circuitry makes the radio transceiver device 200 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a-210e may be implemented by the processing circuitry 210, possibly in cooperation with the communications interface 220 and/or the storage medium 230. The processing circuitry 210 may thus be configured to from the storage medium 230 fetch instructions as provided by a functional module 210a-210e and to execute these instructions, thereby performing any steps as disclosed herein.

The radio transceiver device 200 may be provided as a standalone device or as a part of at least one further device. For example, the radio transceiver device 200 may be provided in a node of the radio access network or in a node of the core network. As disclosed above, according to an embodiment the radio transceiver device 200 is a radio access network node. Alternatively, functionality of the radio transceiver device 200 may be distributed between at least two devices, or nodes. These at least two nodes, or devices, may either be part of the same network part (such as the radio access network or the core network) or may be spread between at least two such network parts.

Thus, a first portion of the instructions performed by the radio transceiver device 200 may be executed in a first device, and a second portion of the of the instructions performed by the radio transceiver device 200 may be executed in a second device; the herein disclosed embodiments are not limited to any particular number of devices on which the instructions performed by the radio transceiver device 200 may be executed. Hence, the methods according to the herein disclosed embodiments are suitable to be performed by a radio transceiver device 200 residing in a cloud computational environment. Therefore, although a single processing circuitry 210 is illustrated in FIG. 5 the processing circuitry 210 may be distributed among a plurality of devices, or nodes. The same applies to the functional modules 210a-210e of FIG. 6 and the computer program 720 of FIG. 7 (see below).

Figure 7:
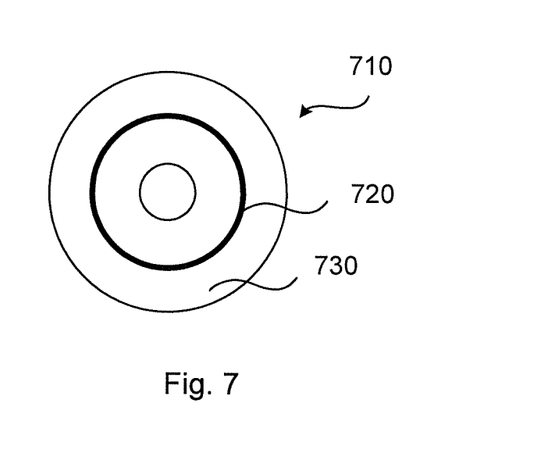
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for adapting which beam to use for communicating signals, the method being performed by a radio transceiver device, wherein the radio transceiver device is capable of communicating the signals using beams selected from a set of beams, the method comprising:
    communicating signals with another radio transceiver device while using a first beam selected from the set of beams;
    detecting that the signals are communicated at decreasing quality level while using the first beam, the decreasing quality level being caused by radio propagation channel deterioration; and in response thereto:
        initiating a switch to a backup beam of the first beam, without performing any beam training, to continue communicating the signals with said another radio transceiver device, thereby adapting which beam to use for communicating the signals,
    wherein the backup beam is selected from the set of beams as constrained to those of the beams having an estimated reference signal received power value or channel quality indication value being within a threshold distance to that of the first beam.

2. The method according to claim 1, wherein communicating the signals comprises transmitting the signals to said another radio transceiver device or receiving the signals from said another radio transceiver device.

3. The method according to claim 1, wherein which of the beams in the set of beams to use as backup beam for the first beam is determined based on statistics collected by the radio transceiver device.

4. The method according to claim 3, wherein the statistics are based on information collected during data reception from said another radio transceiver device or from reports received from said another radio transceiver device.

5. The method according to claim 3, wherein the statistics are collected during periods of blocking of said another radio transceiver device, during periods of mobility measurements of said another radio transceiver device, or during a beam management procedure.

6. The method according to claim 3, wherein the statistics comprises beam pairs indicating which backup beam to use for the first beam.

7. The method according to claim 6, wherein the statistics comprises timing advance values such that each beam pair is associated with one of the timing advance values.

8. The method according to claim 7, wherein each beam in the set of beams is associated with N>1 different timing advance intervals, and wherein a separate backup beam is associated with each of the N timing advance intervals for each of the beams.

9. The method according to claim 1, wherein which antenna elements and/or which analog beam configuration to use for each beam in the set of beams is indexed in a table, and wherein initiating the temporary switch comprises:
 accessing the table to determine which of the antenna elements and/or analog beam configurations to use for the backup beam; and
 communicating the signals in the backup beam using the determined antenna elements and/or analog beam configuration.

10. The method according to claim 1, wherein the radio propagation channel deterioration is detected by at least one of absence of reception of expected signals from said another radio transceiver device, reception of a beam link failure report from said another radio transceiver device, and reference signal received power of signals received from said another radio transceiver device dropping faster than a threshold rate.

11. The method according to claim 1, wherein the backup beam, among all beams in the set of beams, has lowest spatial correlation with the first beam.

12. The method according to claim 11, wherein the lowest spatial correlation corresponds to a maximum difference in pointing direction in angular space.

13. The method according to claim 11, wherein the lowest spatial correlation corresponds to a minimum overlap in antenna diagram space.

14. The method according to claim 1, wherein the first beam has at least two backup beams, the at least two backup beams being ordered according to at least one of increasing spatial correlation with the first beam and decreasing estimated reference signal received power value or channel quality indication value in relation to the first beam.

15. The method according to claim 1, wherein at least two beams in the set of beams share a common backup beam.

16. The method according to claim 1, wherein the radio transceiver device is configured to communicate the signals using the at least one beam of analog beamforming or hybrid beamforming.

17. The method according to claim 1, wherein the propagation channel deterioration is caused by blocking.

18. The method according to claim 1, wherein the radio transceiver device is a radio access network node and wherein said another radio transceiver device is a terminal device.

19. A radio transceiver device for adapting which beam to use for communicating signals, the radio transceiver device being capable of communicating the signals using beams selected from a set of beams and comprising processing circuitry, the processing circuitry being configured to cause the radio transceiver device to:
 communicate signals with another radio transceiver device while using a first beam selected from the set of beams;
 detect that the signals are communicated at decreasing quality level while using the first beam, the decreasing quality level being caused by radio propagation channel deterioration; and in response thereto:
  initiate a switch to a backup beam of the first beam, without performing any beam training, to continue communicating the signals with said another radio transceiver device, thereby adapting which beam to use for communicating the signals,
 wherein the backup beam is selected from the set of beams as constrained to those of the beams having an estimated reference signal received power value or channel quality indication value being within a threshold distance to that of the first beam.

20. A radio transceiver device for adapting which beam to use for communicating signals, the radio transceiver device being capable of communicating the signals using beams selected from a set of beams and comprising:
 processing circuitry; and
 a storage medium storing instructions that, when executed by the processing circuitry, cause the radio transceiver device to:
  communicate signals with another radio transceiver device while using a first beam selected from the set of beams;
  detect that the signals are communicated at decreasing quality level while using the first beam, the decreasing quality level being caused by radio propagation channel deterioration; and in response thereto:
   initiate a switch to a backup beam of the first beam, without performing any beam training, to continue communicating the signals with said another radio transceiver device, thereby adapting which beam to use for communicating the signals,
  wherein the backup beam is selected from the set of beams as constrained to those of the beams having an estimated reference signal received power value or channel quality indication value being within a threshold distance to that of the first beam.

21. A radio transceiver device for adapting which beam to use for communicating signals, the radio transceiver device being capable of communicating the signals using beams selected from a set of beams and comprising:
 a communicate module configured to communicate signals with another radio transceiver device while using a first beam selected from the set of beams;
 a detect module configured to detect that the signals are communicated at decreasing quality level while using the first beam, the decreasing quality level being caused by radio propagation channel deterioration; and
 an initiate module configured to, in response thereto, initiate a switch to a backup beam of the first beam, without performing any beam training, to continue communicating the signals with said another radio transceiver device, thereby adapting which beam to use for communicating the signals,
 wherein the backup beam is selected from the set of beams as constrained to those of the beams having an estimated reference signal received power value or channel quality indication value being within a threshold distance to that of the first beam.

22. The radio transceiver device according to claim 19, wherein the radio transceiver device is a radio access network node and wherein said another radio transceiver device is a terminal device.

23. A computer program for adapting which beam to use for communicating signals, the computer program comprising computer code which, when run on processing circuitry of a radio transceiver device capable of communicating the signals using beams selected from a set of beams, causes the radio transceiver device to:
- communicate signals with another radio transceiver device while using a first beam selected from the set of beams;
- detect that the signals are communicated at decreasing quality level while using the first beam, the decreasing quality level being caused by radio propagation channel deterioration; and in response thereto:
- initiate a switch to a backup beam of the first beam, without performing any beam training, to continue communicating the signals with said another radio transceiver device, thereby adapting which beam to use for communicating the signals,
- wherein the backup beam is selected from the set of beams as constrained to those of the beams having an estimated reference signal received power value or channel quality indication value being within a threshold distance to that of the first beam.

24. A non-transitory computer program product comprising a computer program according to claim 23, and a computer readable storage medium on which the computer program is stored.

* * * * *